(No Model.)
G. F. DOEMLING.
DRESSING CASE.
No. 257,300. Patented May 2, 1882.
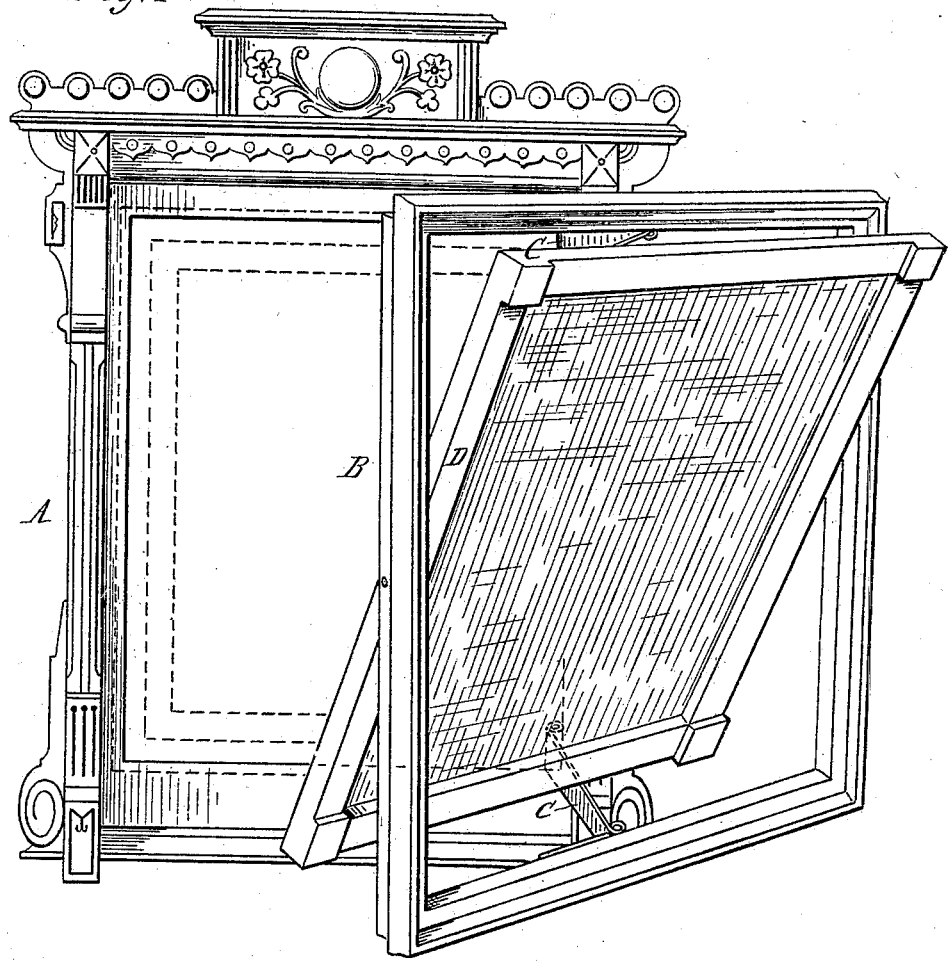
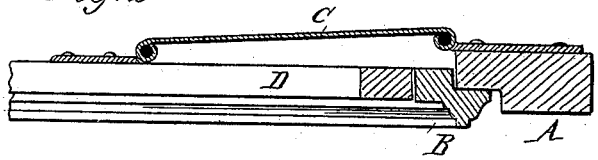

UNITED STATES PATENT OFFICE.

GEORGE F. DOEMLING, OF DETROIT, MICHIGAN.

DRESSING-CASE.

SPECIFICATION forming part of Letters Patent No. 257,300, dated May 2, 1882.

Application filed December 28, 1881. (No model.)

*To all whom it may concern:*

Be it known that I, GEORGE F. DOEMLING, of Detroit, in the county of Wayne and State of Michigan, have invented new and useful Improvements in Dressing-Cases; and I hereby declare that the following is a full, clear, and exact description thereof, reference being had to the accompanying drawings, which form a part of this specification.

The nature of my invention relates to new and useful improvements in the method of hanging mirrors in frames, especially adapted to and forming a part of dressing-cases or toilet-tables, by means of which the mirror itself may be swung out of the standard-frame to any desired position with relation to the light to obtain the most perfect result, and by which, in addition to this movement, the mirror may be tilted to enable the user to examine the full length of her figure.

The invention consists in the peculiar construction and combination of parts to produce the result sought to be attained, as more fully hereinafter set forth.

Figure 1 is a perspective with the glass removed, showing the frame within which the glass is secured tilted and pivotally supported within another frame, which is swung out of the main frame, to which it is secured by hinges of a peculiar construction. Fig. 2 is a part section of my device as it appears when folded.

In the accompanying drawings, which form a part of this specification, A represents the main frame, which may be of any desired size and such as is ordinarily employed to secure a mirror upon a dressing-table. B is the frame fitting within the frame A, to which it is secured by means of the double hinges C in such manner as will allow said frame B to be swung out of the frame A forward and sidewise to secure the best light, another frame, D, which fits within the frame B, and is pivotally secured thereto upon trunnions or screws, passing through the sides of the frame B into the frame D; and within this latter-named frame the mirror-plate is secured.

I am aware that mirrors have before been so hinged and pivoted that they have been susceptible of adjustment at various angles, and such features are not sought to be covered broadly in this application.

It will be noticed that in my device the mirror is not only so pivoted that it may be given any desired angle relative to a vertical plane and hinged vertically, but that frame B and mirror have an independent movement irrespective of the main frame and may be moved outward from said main frame at will by means of the hinge-arms C.

What I claim as new is—

The stationary frame A and vertically-pivoted frame B, combined with the mirror D, having horizontal pivots, and with the hinge-arms C, connected to the top and bottom of the frame B, all operating together as and for the purpose specified.

GEORGE F. DOEMLING.

Witnesses:
H. S. SPRAGUE,
CHAS. J. HUNT.